United States Patent
Chen et al.

(10) Patent No.: US 10,102,768 B2
(45) Date of Patent: Oct. 16, 2018

(54) BEHAVIOR VARIABILITY AND COMPLEXITY MODELING USING A CONSTRUCTION TOY

(71) Applicant: FUJITSU LIMITED, Kawasaki-shi, Kanagawa (JP)

(72) Inventors: Cong Chen, Cupertino, CA (US); Ajay Chander, San Francisco, CA (US); Kanji Uchino, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 272 days.

(21) Appl. No.: 15/075,125

(22) Filed: Mar. 19, 2016

(65) Prior Publication Data
US 2017/0270814 A1   Sep. 21, 2017

(51) Int. Cl.
*A63H 33/04* (2006.01)
*G09B 19/00* (2006.01)
*A63F 9/00* (2006.01)

(52) U.S. Cl.
CPC ............ *G09B 19/00* (2013.01); *A63F 9/0001* (2013.01); *A63H 33/042* (2013.01); *A63H 33/046* (2013.01); *A63H 2200/00* (2013.01); *G06T 2219/2008* (2013.01)

(58) Field of Classification Search
CPC .................................................... A63H 33/04
See application file for complete search history.

(56) References Cited

U.S. PATENT DOCUMENTS

| 6,568,869 B1 | 5/2003 | Murata | |
| 7,480,597 B2 * | 1/2009 | Clark | G06F 17/50 700/106 |
| 2008/0228450 A1 * | 9/2008 | Jakobsen | G06T 17/10 703/2 |
| 2016/0051904 A1 * | 2/2016 | Abir | A63H 33/042 446/484 |

FOREIGN PATENT DOCUMENTS

| KR | 2010-0107998 A | 10/2010 |
| WO | 2014/032043 A1 | 2/2014 |

OTHER PUBLICATIONS

GravitySketch2015, Retrieved on Mar. 19, 2016. Retrieved from <https://www.gravitysketch.com/index.html>.
(Continued)

*Primary Examiner* — Omkar Deodhar
(74) *Attorney, Agent, or Firm* — Maschoff Brennan

(57) ABSTRACT

A system includes a memory and a processor operatively coupled to the memory. The processor being configured to execute instructions to monitor a behavior of a player of a first construction toy. The first construction toy includes at least one sensor to detect a first construction made by the player between the first construction toy and a second construction toy. The processor being further configured to record the first construction made by the player between the first construction toy and the second construction toy. The processor also being configured to identify a preexisting second construction that is similar to the first construction. The processor being configured to group all the construc-
(Continued)

tions. The processor being further configured to determine a behavior variability and a complexity level for the player based on the construction operations and structures.

20 Claims, 14 Drawing Sheets

(56) References Cited

OTHER PUBLICATIONS

Elison, Jed T., et al. "Repetitive behavior in 12-month-olds later classified with autism spectrum disorder." Journal of the American Academy of Child & Adolescent Psychiatry vol. 53, Issue 11, Nov. 1, 2014: 1216-1224.

Zuckerman, K., et al. "Parental Concerns, Provider Response, and Timeliness of Autism Spectrum Disorder Diagnosis." The Journal of pediatrics, vol. 166, Issue 6, Jun. 2015, pp. 1431-1439.e1.

Albinali, F., et al, "Recognizing stereotypical motor movements in the laboratory and classroom: a case study with children on the autism spectrum." Proceedings of the 11th international conference on Ubiquitous computing. ACM, Sep. 30, 2009.

Goncalves, N., et al. "Preliminary study on determining stereotypical motor movements." Engineering in Medicine and Biology Society (EMBC), 2012 Annual International Conference of the IEEE. IEEE, Aug. 28, 2012.

Riesen, Kaspar, and Horst Bunke. "Approximate graph edit distance computation by means of bipartite graph matching." Image and Vision Computing vol. 27, Issue 7, Jun. 4, 2009, pp. 950-959.

Nikolic, Mladen. "Measuring similarity of graph nodes by neighbor matching." Intelligent Data Analysis, vol. 16, Issue 6, Sep. 27, 2012, pp. 865-878.

Karypis, G., et al., "Chameleon: Hierarchical clustering using dynamic modeling." Computer vol. 32, Issue 8 (Aug. 1999): 68-75.

Runco, Mark A., and Garrett J. Jaeger. "The standard definition of creativity." Creativity Research Journal vol. 24, Issue 1, Feb. 10, 2012, pp. 92-96.

Hassink, S., "AAP Statement on U.S. Preventive Services Task Force Draft Recommendation Statement on Autism Screening" American Academy of Pediatrics, Aug. 3, 2015. Retrieved from <https://www.aap.org/en-us/about-the-aap/aap-press-room/Pages/AAP-Statement-on-U-S-Preventive-Services-Task-Force-Draft-Recommendation-Statement-on-Autism-Screening.aspx>.

Stiles, Joan, and Catherine Stern. "Developmental change in spatial cognitive processing: Complexity effects and block construction performance in preschool children." Journal of Cognition & Development. May 2001, vol. 2 Issue 2, p. 157-187. 31, p. 1.

Hosoi, T., et al. "A-blocks: recognizing and assessing child building processes during play with toy blocks." SIGGRAPH Asia 2014 Emerging Technologies. ACM, Nov. 2014.

Kleinman, Jamie M. et al. "Diagnostic Stability in Very Young Children with Autism Spectrum Disorders." Journal of autism and developmental disorders vol. 38, Issue 4, Apr. 2008, pp. 606-615. PMC. Web. Mar. 18, 2016.

"Prevalence of Autism Spectrum Disorder Among Children Aged 8 Years—Autism and Developmental Disabilities Monitoring Network, 11 Sites, United States, 2010." Autism and Developmental Disabilities Monitoring Network Surveillance Year 2010 Principal Investigators. (2014). Centers for Disease Control and Prevention Morbidity and Mortality Weekly Report. Mar. 28, 2014, vol. 63, No. 2, pp. 1-21.

European Search Report issued in corresponding application No. 16 20 5489, dated Jun. 19, 2017.

* cited by examiner

BEHAVIOR VARIABILITY AND COMPLEXITY MODELING USING A CONSTRUCTION TOY

FIELD

The embodiments discussed in the present disclosure are related to behavior variability and complexity modeling using a construction toy.

BACKGROUND

Construction toys have been available in relatively the same state for a number of years. Example construction toys may include Legos® and Lincoln Logs®. Construction toys may be used for enjoyment as well as for learning and teaching.

The subject matter claimed in the present disclosure is not limited to embodiments that solve any disadvantages or that operate only in environments such as those described above. Rather, this background is only provided to illustrate one example technology area where some embodiments described may be practiced. Furthermore, unless otherwise indicated, the materials described in the background section are not prior art to the claims in the present application and are not admitted to be prior art by inclusion in this section.

SUMMARY

According to an aspect of an embodiment, a system includes a memory and a processor operatively coupled to the memory. The processor being configured to execute instructions to monitor a behavior of a player of a first construction toy. The first construction toy includes at least one sensor to detect a first construction made by the player using the first construction toy and a second construction toy. The processor being further configured to record the first construction made by the player using the first construction toy and the second construction toy. The processor also being configured to identify a preexisting second construction that is similar to the first construction. The processor being configured to group all the constructions. The processor being further configured to determine a behavior variability and a complexity level for the player based on the construction operations and structures.

The object and advantages of the implementations will be realized and achieved at least by the elements, features, and combinations particularly pointed out in the claims.

It is to be understood that both the foregoing general description and the following detailed description are given as examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Early detection of various disorders and diseases, such as autism, may be difficult. For example, an average diagnosis age for autism is around 4 years old in United States [Kleinman, Jamie M. et al. "Diagnostic Stability in Very Young Children with Autism Spectrum Disorders." *Journal of autism and developmental disorders* 38.4 (2008): 606-615. PMC. Web. 18 Mar. 2016.], while a child may be diagnosed as young as 2 years [Autism and Developmental Disabilities Monitoring Network Surveillance Year 2010 Principal Investigators. (2014). Prevalence of Autism Spectrum Disorder Among Children Aged 8 Years—Autism and Developmental Disabilities Monitoring Network, 11 Sites, United States, 2010." *Centers for Disease Control and Prevention Morbidity and Mortality Weekly Report.* 63(2), 1-21]. This gap between the detectable age and average diagnosis age may be due to a relative difficulty for humans to notice early signs of autism.

Aspects of the present disclosure pertain to assessing behavior variability and complexity using a construction toy. In at least one embodiment, the construction toy may be suitable for use by a small child. With an added interest in the construction toy, the small child may be more likely to play with the construction toy more frequently. The systems and methods described herein, including the construction toy, may monitor and model the child's behavior with little or no human interaction. More frequent play by the child may result in more data about the child related to possible detection and diagnosis of various disorders and diseases.

Figure 1:
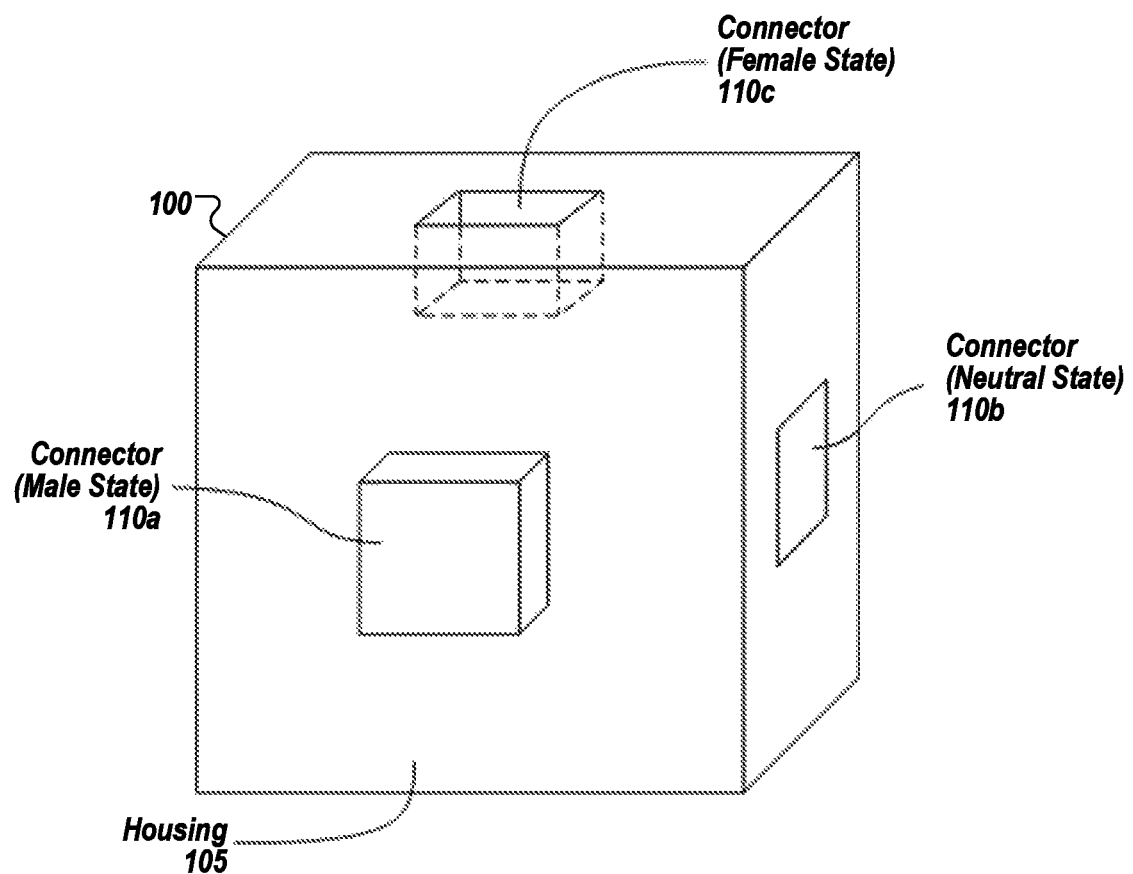
FIG. 1 illustrates an example construction toy with one or more controllable connectors.

FIG. 1 illustrates an example construction toy 100 with one or more controllable connectors. The one or more controllable connectors may be adjustable between at least two connectivity states so as to allow, encourage, discourage or prevent connection of the construction toy 100 to an adjacent construction toy. In at least one embodiment, the connectivity states include male, female, and neutral states. In at least one alternative embodiment, the connectivity states may include enabled and disabled states.

The construction toy 100 may include a housing 105 of any shape or size. The housing 105 may include any number of sides or walls. The housing 105 may include a solid piece of material and may also include one or more cavities for various components, such as a sensor, operating assembly, etc., as described below. As illustrated, the housing 105 includes a cube with six external walls to form six sides. The housing 105 may include any number of sides.

The construction toy 100 may also include one or more controllable connectors 110. As illustrated, the construction toy 100 includes three connectors—a male state connector 110a, a neutral state connector 110b, and a female state connector 110c. As illustrated, the connectors 110a, 110b, 110c may include a shape with a square profile. The connectors 110a, 110b, 110c may be any shape or size. The construction toy 100 may include any number of connectors 110 and any number of connectors 110 may be positioned on a particular side on the construction toy 100.

The housing 105 may also include one or more cavities or voids through which the one or more connectors 110 may be coupled. As illustrated, the cavities in the housing are substantially the same shape as the connectors 110 with the square profile. The male state connector 110a may extend through a first cavity and outward with respect to the housing 105. The male state connector 110a may be configured to fit within a female state connector of an adjacent construction toy (not illustrated). The female state connector 110c may be recessed in a second cavity with respect to an outer surface of the housing of the adjacent construction toy. The neutral state connector 110b may be substantially parallel with an outer surface of the housing 105 such that the neutral state connector 110b may be flush with the outer surface of the housing 105.

The construction toy 100 may be part of a set of construction toys that may be connected to and decoupled from each other. Each construction toy in the set be associated with store a block identifier. Similarly, each connector on each construction toy in the set may be associated with a connector identifier. In at least one embodiment, the connector identifier may be associated with a respective construction toy. For example, a construction toy may include a block identifier "ABC123" and a first connector of the construction toy may include a first connector identifier "ABC123:001", a second connector of the construction toy may include a second connector identifier "ABC123:002", a third connector of the construction toy may include a third connector identifier "ABC123:003", and so on. The connector identifiers may also be associated with a block map that identifies the location of each of the connector with respect to each other. For example, a cube-shaped construction toy 100 may have six connectors with one connector on each face. The block map may include the six faces as locations for the six connectors. The block identifiers may be integrated into the block map, such that the first connector identifier "ABC123:001" is indicative of the first connector being on a first of the six faces, the second connector identifier "ABC123:002" being indicative of the second connector being on a second of the six faces, and so on. In at least one alternative embodiment, the location of the connector with respect to the construction toy 100 is separate from the block identifier and the connector identifier. The block identifier, the block map, and the connector identifier may be stored on another device, such as on another construction toy or a host computer device.

Each construction toy in the set may include at least one location sensor capable of reading its location relative to adjacent construction toys that are near or connected to the construction toy. The location sensor may also be capable of reading a location of an adjacent construction toy relative to the construction toy. Each construction toy in the set may selectively control its respective connectors in response to predefined rules and its location relative to adjacent blocks that are near or connected to the construction toy. For example, each construction toy in the set may selectively control its respective connectors to retract a connector to prevent repetitive behavior, to guide a player to build the construction toys in a new directions, or to detect and manage repetitive patterns, as further described below.

Figure 2:
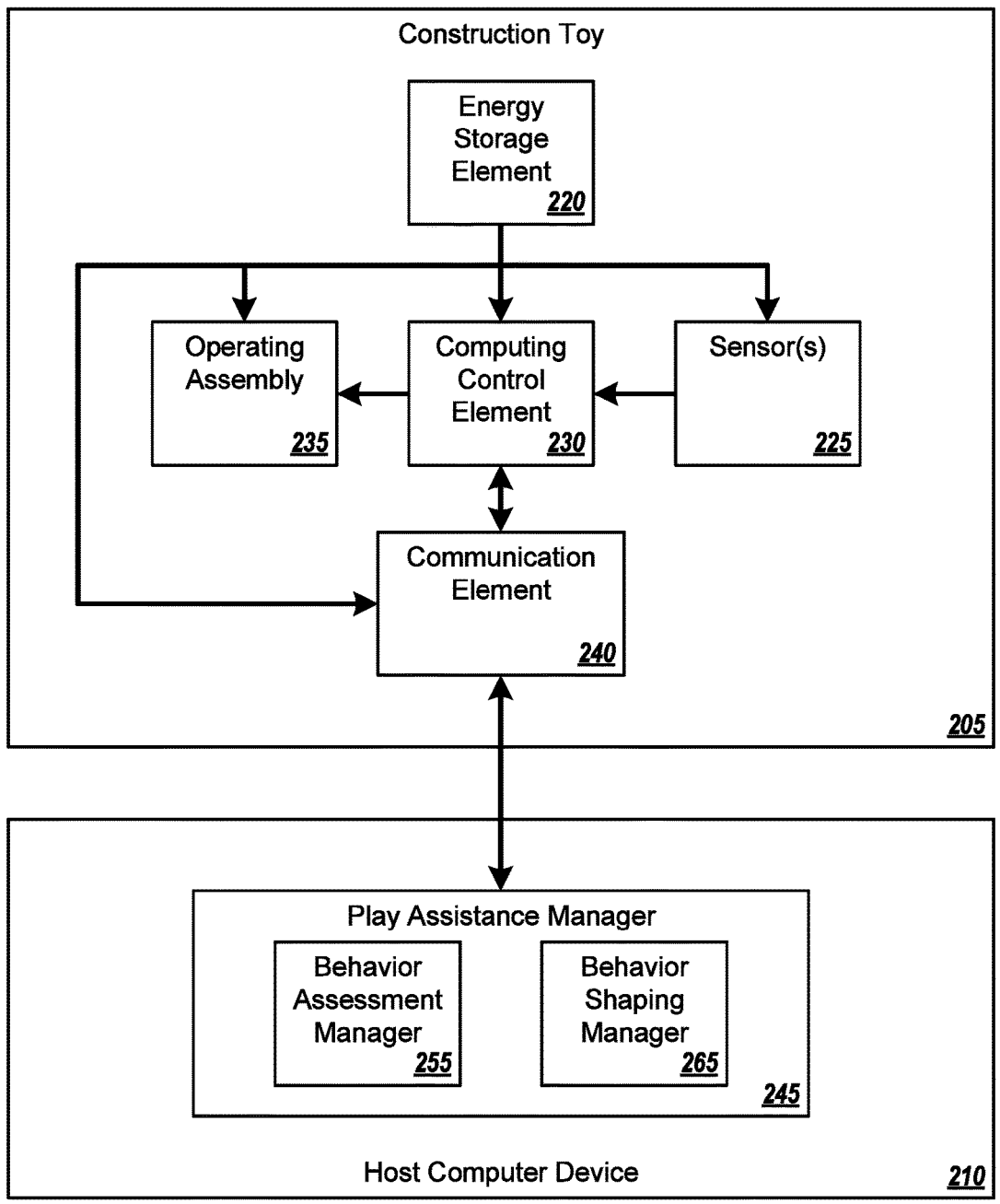
FIG. 2 illustrates a block diagram of an example operating environment in which some embodiments may be implemented.

FIG. 2 illustrates a block diagram of an example operating environment in which some embodiments may be implemented. The operating environment 200 may include a construction toy 205 and a host computer device 210. The construction toy 205 may be the same as or similar to the construction toy 100 of FIG. 1. The host computer device 210 may monitor construction of a set of construction toys and may determine transformations to be performed on connectors of the construction toys. The construction toy 205 may detect and send location data to the host computer device 210 and execute received commands. The construction toy 205 may include an energy storage element 220, one or more sensors 225, a computing control element 230, an operating assembly 235, and a communication element 240.

The construction toy 205 may be part of a set of construction toys that may be coupled to and decoupled from each other. Each construction toy in the set may include at least one sensor 225 capable of reading its location relative to adjacent blocks that are near or connected to the construction toy. The at least one sensor 225 may also be capable of reading a location of an adjacent construction toy relative to the construction toy 205. Each construction toy may also include a programmable computing control element to execute computer programs and to operate the connectors.

The energy storage element 220 may supply electrical power to the one or more sensors 225 computing control element 230, operating assembly 235, and communication element 240. The energy storage element 220 may include a charging device and/or an energy conversion component that may transform power in real time. The energy storage element 220 may include a battery or other similar device configured to store energy.

The one or more sensors 225 may be configured to detect a characteristic of an adjacent construction toy. The characteristic of the adjacent construction toy may include proximity, location, motion, position, orientation, temperature, emitted or reflected light, radio frequency identification (RFID), etc. The one or more sensors 225 may include a proximity sensor, NFC sensor, sonar sensor, infrared sensor, temperature sensor, light sensor, motion sensor, accelerometer, gyroscope, orientation sensor, etc. to detect the characteristic of the adjacent construction toy. The one or more sensors 225 may be operatively connected to the computing control element 230 and the one or more sensors 225 may send data to the computing control element 230. For example, a sensor 225 may detect that the construction toy 100 has been operatively coupled to an adjacent construction toy. The sensor 225 may send data indicative of the coupling—including a block identifier of the construction toy 205, a connector identifier of the construction toy 205 that was coupled to the adjacent construction toy, a block identifier of the adjacent construction toy, a connector identifier of the adjacent construction toy, etc. Alternatively, each construction toy may gather and report data for itself and not for other construction toys. For example, the sensor 225 may send data indicative of the coupling—including a block identifier of the construction toy 205, a connector identifier of the construction toy 205 that was coupled to the adjacent construction toy, etc. The adjacent construction toy may send a respective a block identifier of the adjacent construction toy, a connector identifier of the adjacent construction toy, etc. The sensor data may be sent to the computer control element 230, to the communication element 240 and/or to the host computer device 210. Using these and other techniques, data pertaining to the coupling of construction toys may be collected and sent to the host computer device 210.

The computing control element 230 may include a processor to execute instructions and operate the operating assembly 235. The computing control element 230 may include processing logic to control the operating assembly 235 to change state of one or more connectors. The computing control element 230 may include a programmable computer element. The computing control element 230 may receive instructions from the host computer device 210 pertaining to the control of the one or more connectors. The instructions may relate to changing a state of one or more connectors to encourage or discourage certain behavior of the player of the construction toy 205, as further described below.

The operating assembly 235 may include a connector and a mechanism to change the state of the connector. An example operating assembly 235 may include an actuator and a shaft coupled to the connector to actuate the connector to different connectivity states, as further described in conjunction with FIGS. 3, 4A, 4B and 4C. Another example operating assembly 235 may include a magnetic or electro-magnetic connector that may be selectively powered to change the connectivity state of the connector, as further described in conjunction with FIGS. 5 and 6.

The communication element 240 may be attached to the computing control element 230 to communicate with a paired host computer device 210. The communication element 240 may connect to any other device, such as the host computer device 210, using any form of wireless communication capability. In some embodiments, the communication element 240 may include a radio frequency (RF) antenna. By way of example and not limitation, the communication element 240 may be configured to provide, via wireless mechanisms, LAN connectivity, Bluetooth connectivity, Wi-Fi connectivity, NFC connectivity, M2M connectivity, D2D connectivity, GSM connectivity, 3G connectivity, 4G connectivity, LTE connectivity, any other suitable communication capability, or any suitable combination thereof. The construction toy 205 may include any number of communication elements 240. The construction toy 205 may connect to any network, such as wide area networks (WANs) and/or local area networks (LANs). For example, secured and/or encrypted data may be exchanged between the construction toy 205 and the host computer device 210. In some embodiments, the network includes the Internet, including a global internetwork formed by logical and physical connections between multiple WANs and/or LANs. Alternately or additionally, the network may include one or more cellular RF networks and/or one or more wired and/or wireless networks such as, but not limited to, 802.xx networks, Bluetooth access points, wireless access points, IP-based networks, meshed devices, or the like. The network may also include one or more servers that enable one type of network to interface with another type of network.

The host computer device 210 may include one or more client or server computing devices, (such as a personal computer (PC), game console, set top box, laptop, mobile phone, smart phone, tablet computer, netbook computer, e-reader, personal digital assistant (PDA), or cellular phone, wearable device, electronic wristwatch, arm band, chest strap, head band, bracelet, wristband, rackmount server, a router computer, a server computer, a personal computer, a mainframe computer, a laptop computer, a web server, a proxy server, a desktop computer, etc.), data stores (e.g., hard disks, memories, databases), networks, software components, and/or hardware components. The host computer device 210 may include a play assistance manager 245.

The play assistance manager 245 may model and guide behavior of a player of a set of construction toys. The play assistance manager 245 may generate instructions to control various the connectivity state of connectors in the set of construction toys, including the construction toy 205. The play assistance manager 245 may receive data from the one or more sensors 225 via the communication element 240. The play assistance manager 245 may use the received data to determine when to change a state of one or more connectors. The play assistance manager 245 may include a set of predetermined rules that indicate when to change a state of one or more connectors. The predetermined rules may include one or more conditions for a change of state of a connector. When the play assistance manager 245 determines (based on sensor data) that a player is engaging in repetitive behavior when playing with the construction toys, for example, the play assistance manager 245 may generate an instruction to change the connectivity state of one or more connectors to encourage different the player to engage in different techniques to play with the construction toys. In some embodiments, the play assistance manager 245 may include a stand-alone application ("app") that may be downloadable either directly from a host or from an application store. The play assistance manager 245 may include a behavior assessment manager 255 and a behavior shaping manager 265.

The behavior assessment manager 255 may determine various characteristics pertaining to a player of a set of construction toys. The behavior assessment manager 255 may monitor and model the construction made by the set of construction toys. The behavior assessment manager 255 may monitor how the player interacts with the set of construction toys and may record every connection the player may make using construction toys. The behavior assessment manager 255 may group structurally similar constructions. The behavior assessment manager 255 may also measure behavior variability and complexity between the constructions. For example, as a player builds a house, the behavior assessment manager 255 uses sensor data from the one or more sensors 225 to determine the player's progress on building the house. The behavior assessment manager 255 may also generate a visualization of the measured behavior variability and complexity between the constructions over time. The behavior assessment manager 255 may also generate a visualization for a particular object the player is building. For example, as the player connects construction toys, the behavior assessment manager 255 may update the digital representation of the house to reflect the physical progress of the house. The behavior assessment manager 255 may also generate a chart or graph to visualize the player's activities over time, examples of which are described in conjunction with FIGS. 11A, 11B and 11C.

The behavior shaping manager 265 may generate and/or manage a construction model that may include a set of instructions for building a particular object. The construction model may also include a set of guided instructions to encourage learning and/or a particular behavior. The construction model may also include a digital (e.g., graphical) representation of a current configuration of the set of construction toys. For example, when the player builds a house out of the set of construction toys, the construction model may be a digital representation of the house. The construction model may also guide the player on how to build a particular object. The construction model may include the current configuration of the set of construction toys and one or more locations for where to place the next construction toy to build the particular object. A helper may observe the digital representation of the set of construction toys and may define an instruction to be sent to the construction toy 205. The helper may include any individual or computer that may provide assistance to the player. For example, when the helper identifies a particular undesired behavior of the player, the helper may define an instruction to discourage or prevent the particular undesired behavior of the player. The instruction may include an instruction to disable connections between some or all of the construction toys. In at least one embodiment, the behavior shaping manager 265 may include features described in Application Ser. No. 15/076, 602, which is incorporated herein by reference.

In at least one embodiment, the construction toy 205 and the host computer device 210 are integrated into a single digital platform. In this embodiment, the construction toy 205 may be a digitized or digital representation of the construction toy 205. The player may interact with the digitized construction toy 205 via an application. For example, the application may include a construction toy building game and an interface (e.g., a graphical user interface (GUI) by which the player may interact with construction toys. Some or all of the components of the host computer device 210 may be part of the application. For example, the application may include at least portions of the behavior assessment manager 255 and a behavior shaping manager 265. The application may permit the player to interact with digitized construction toys while monitoring and guiding the player, all from within the application. In at least one embodiment, the player may interact with the application on a user device, which may be operatively coupled to the host computer device 210, such as via a network. The application may send data to the host computer device 210 via the network. The host computer device 210 may process the data and may send instructions to the application via the network.

Figure 3:
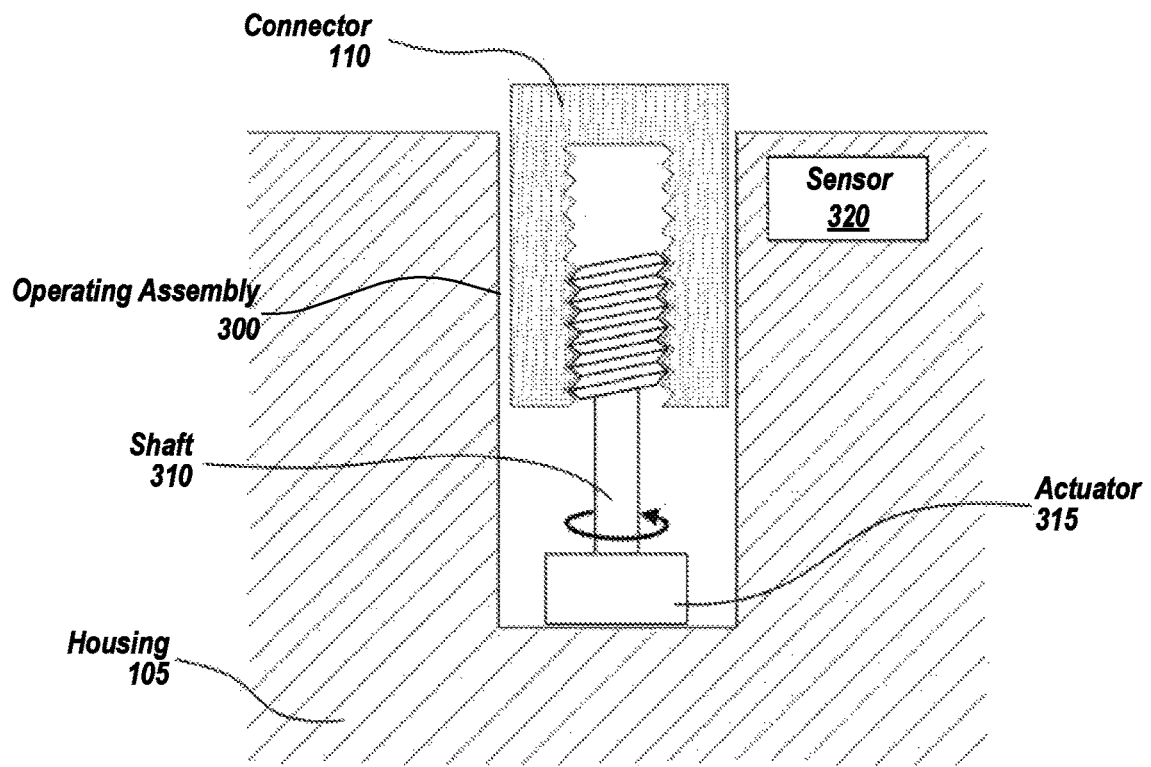
FIG. 3 illustrates an example operating assembly.

FIG. 3 illustrates an example operating assembly 300. The operating assembly 300 may be the same as or similar to the operating assembly 235 described in conjunction with FIG. 2. As illustrated, the operating assembly 300 includes a connector 110, a shaft 310, and an actuator 315. The connector 110 may be coupled to the shaft 310 which may be coupled to the actuator 315 such that movement of the actuator 315 and/or the shaft 310 may cause translational movement of the connector 110 with respect to an outer surface of the housing 105. In at least one embodiment, the actuator 315 may cause rotational movement of the shaft 310. The shaft 310 may be coupled to the actuator on a first end and may have threads on a second end. The connector 110 may include threads that may be coupled to the shaft 310 at the threaded end of the shaft 310. The connector 110 may be rotationally fixed such that rotational movement of the connector 110 may be restricted. In this configuration, rotational movement of the shaft 310 may cause the connector 110 to laterally translate out of and into the housing 105.

The operating assembly 300 may also include a sensor 320 near the connector, which may be used to detect coupling to an adjacent connector. The sensor 320 may be the same as or similar to the sensor 225 of FIG. 2. The sensor 320 may detect a proximity and/or state of a connector on an adjacent construction toy (i.e., an alien connector), the presence of which may be used to transform the connector to a compatible state with the alien connector. For example, if the alien connector is in a female state, the connector on the construction toy may be changed to a male state so as to enable coupling of the construction toy to the adjacent construction toy. In another example, in response to detecting the alien connector or the adjacent construction toy, the connector on the construction toy may be changed to a neutral state to disable coupling of the construction toy to the adjacent construction toy.

Figure 4A:
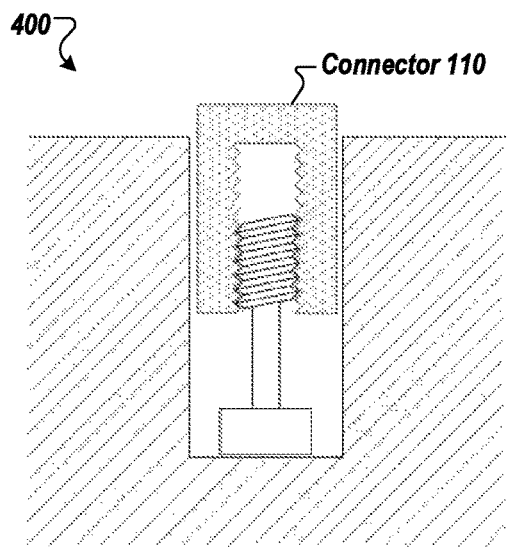
FIGS. 4A, 4B and 4C illustrate three different connectivity states of the operating assembly of FIG. 3.
Figure 4B:
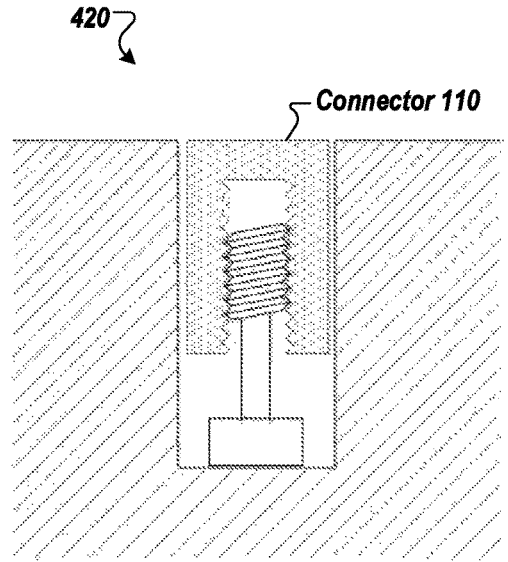
Figure 4C:
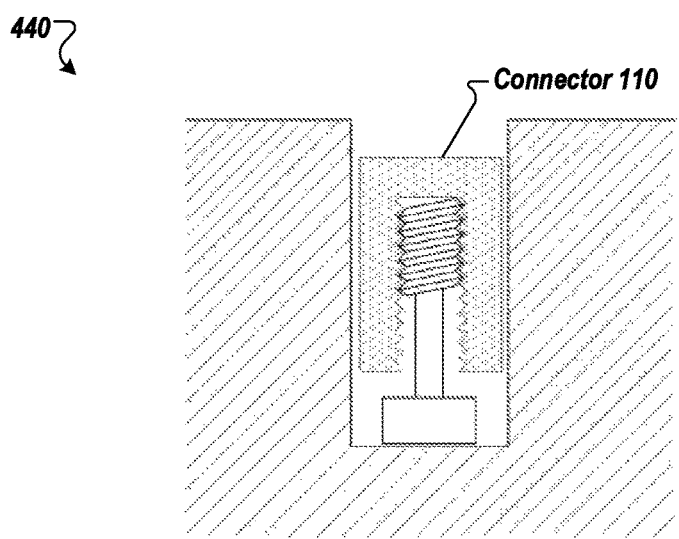

FIGS. 4A, 4B and 4C illustrate three different connectivity states 400, 420, 440 of the operating assembly 300 of FIG. 3. As illustrated in FIG. 4A, the connector 110 is in a male configuration such that the connector 110 extends outward from the housing. As illustrated in FIG. 4B, the connector 110 is in a neutral configuration such that the connector 110 is substantially flush with an outside surface of the housing. As illustrated in FIG. 4C, the connector 110 is in a female configuration such that the connector 110 is recessed within the housing.

Figure 5:
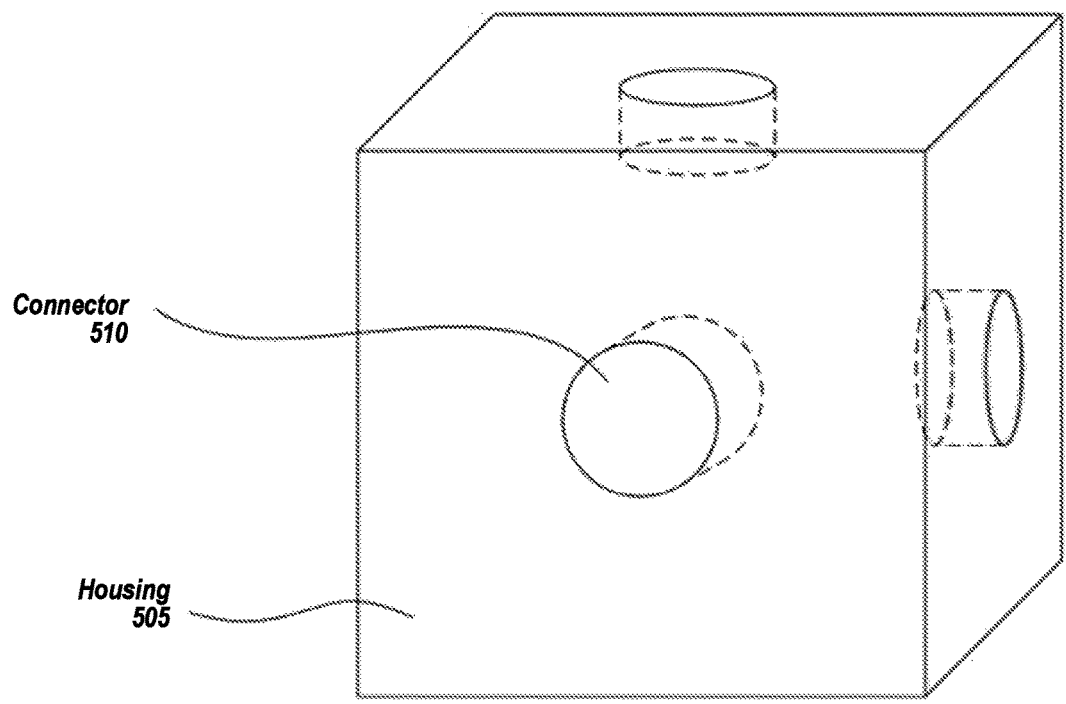
FIG. 5 illustrates another embodiment of a construction toy that includes a housing and at least one electromagnetic connector.

FIG. 5 illustrates another embodiment of a construction toy 500 that includes a housing 505 and at least one electromagnetic connector 510. The housing 505 may be the same as or similar to the housing 105 of FIG. 1. As illustrated, the construction toy 500 includes three electromagnetic connectors. The electromagnetic connectors may be selectively powered on or off to enable or disable coupling to the particular connector. Additionally, the polarity of electromagnetic connectors may be selectively flipped to enable or disable coupling to the particular connector.

Figure 6:
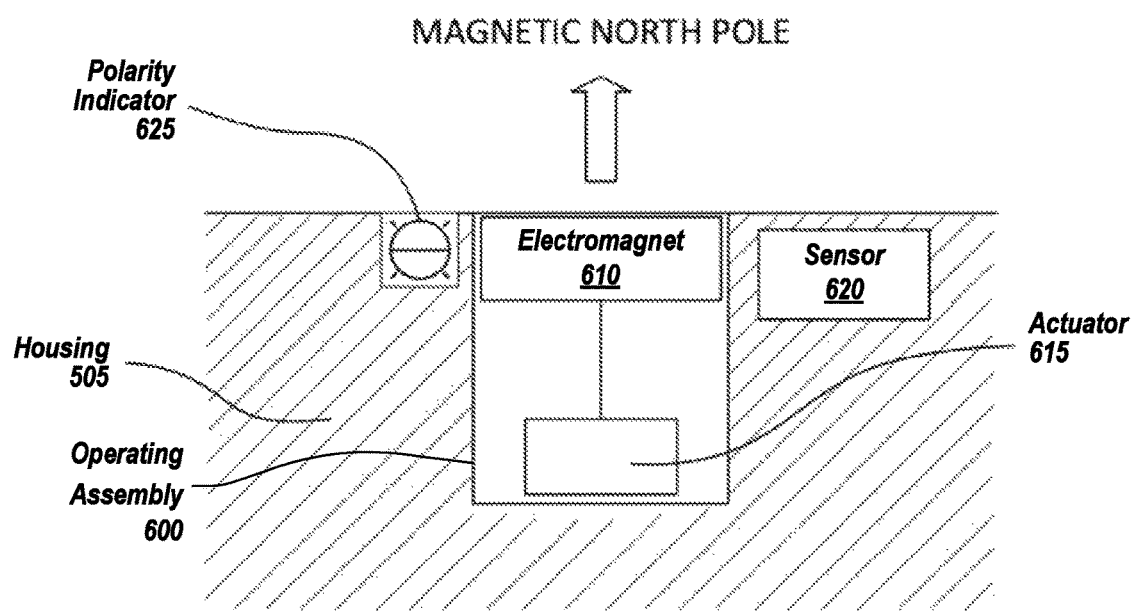
FIG. 6 illustrates another example operating assembly.

FIG. 6 illustrates another example operating assembly 600. The operating assembly 600 may be the same as or similar to the operating assembly 235 described in conjunction with FIG. 2. As illustrated, the operating assembly 600 includes an electromagnetic connector 610 and an actuator 615. The electromagnetic connector 610 may be coupled to the actuator 315 such that movement of the actuator 315 may cause the electromagnetic connector 610 to power on or off. In a powered on state, the electromagnetic connector 610 may be operable to be coupled to an adjacent construction toy. Specifically, the electromagnetic connector 610 may be coupled to an electromagnetic connector of the adjacent construction toy.

The operating assembly 600 may also include a sensor 620 near the electromagnetic connector 610, which may be used to detect coupling to an adjacent electromagnetic connector. The sensor 620 may be the same as or similar to the sensor 225 of FIG. 2. The sensor 620 may detect a proximity and/or state of a connector on an adjacent construction toy (i.e., an alien connector), the presence of which may be used to transform the connector to a compatible state with the alien connector. For example, if the alien connector is in a powered on state, the connector on the construction toy may be changed to a powered on state so as to enable coupling of the construction toy to the adjacent construction toy. In another example, in response to detecting the alien connector or the adjacent construction toy, the connector on the construction toy may be changed to a powered off state to disable coupling of the construction toy to the adjacent construction toy.

The operating assembly 600 may also include a polarity indicator 625. The polarity indicator 625 may indicate a current state of the electromagnetic connector 610 (north or south, positive or negative). The actuator 615 may flip the polarity of electromagnetic connector 610, such as in response to receiving a polarity instruction from a host computer. To flip the polarity of the electromagnetic connector 610, the actuator 615 may alternate a direction of electric current. In at least one embodiment, the polarity indicator 625 includes a light (e.g., LED light) that may be adjacent to the electromagnetic connector 610. In at least one embodiment, the polarity indicator 625 includes a light that is attached to the electromagnetic connector 610. In at least one embodiment, a first state of the polarity is indicated by a first wavelength (or range) or color of light and a second state of the polarity is indicated by a second wavelength (or range) or color of light. In at least one alternative embodiment, a first state of the polarity is indicated by a first blinking pattern of the light and a second state of the polarity is indicated by a second blinking pattern of the light.

Figure 7:
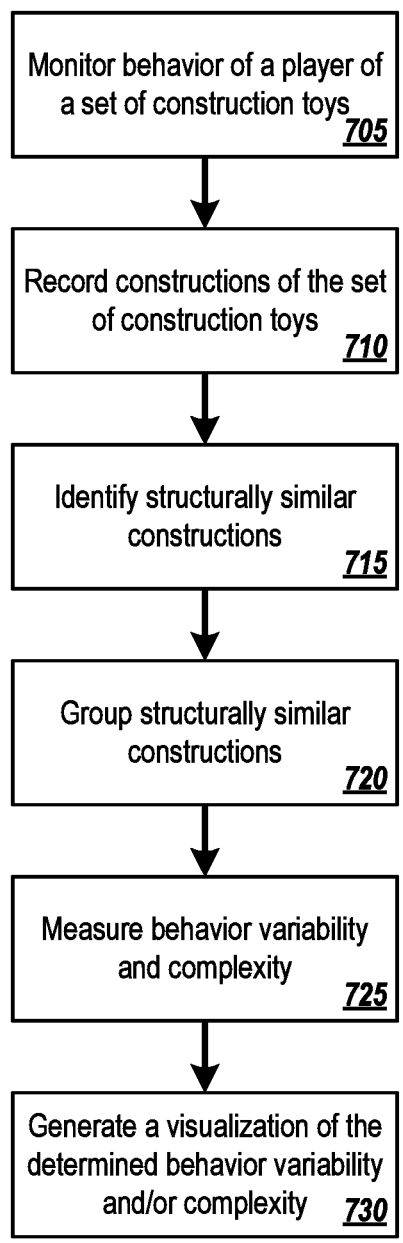
FIG. 7 illustrates a flow diagram of an example method to monitor and model an object construction made from a set of construction toys.
Figure 8:
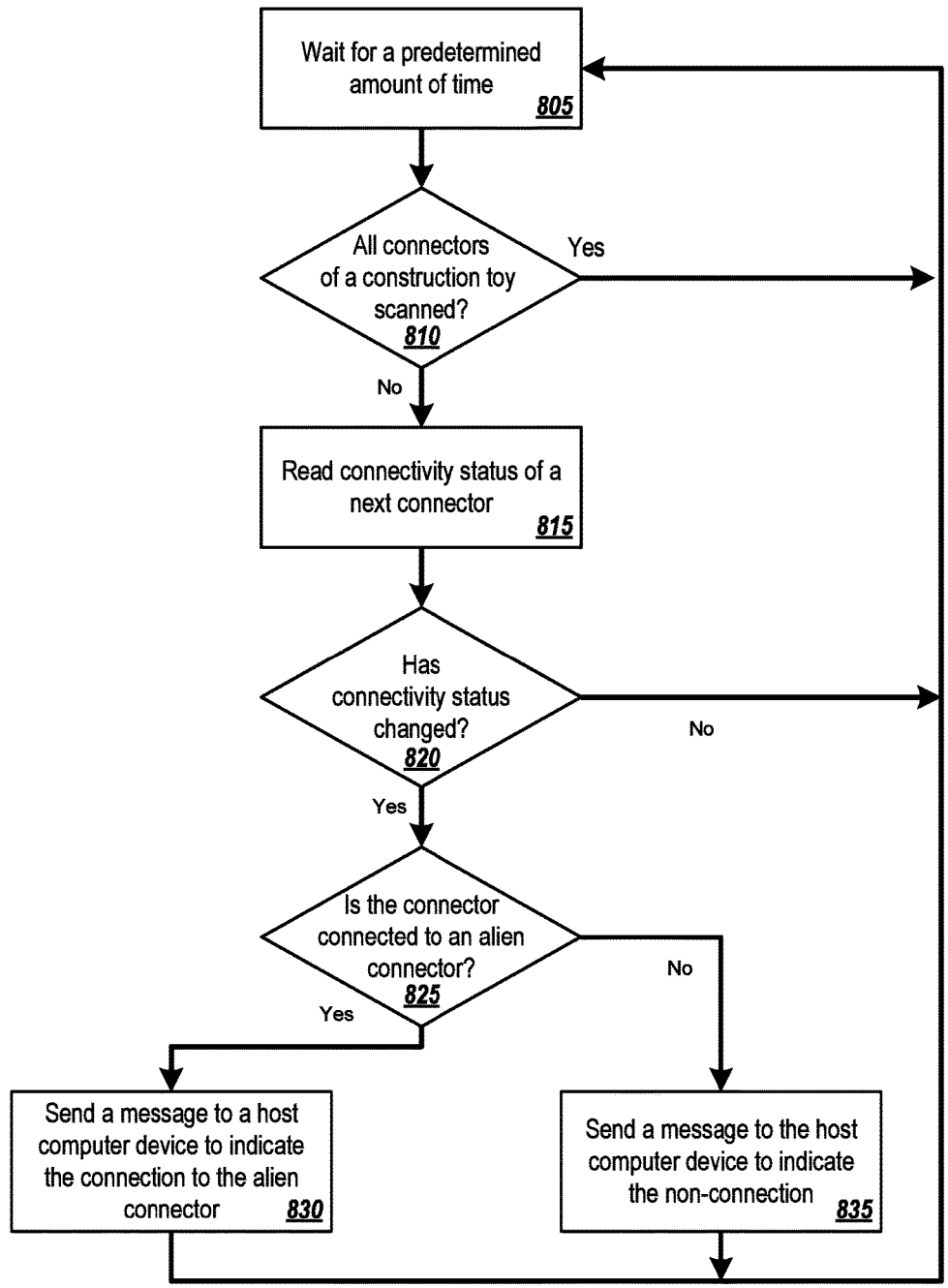
FIG. 8 illustrates a flow diagram of an example method to send sensor data to a host computer device.

FIGS. 7-8 illustrate flow diagrams of example methods to analyze behavior of a player of one or more construction toys that may be implemented, for example, in the operating environment of FIG. 2, arranged in accordance with at least one embodiment described in the present disclosure. The methods may be performed by processing logic that may include hardware (circuitry, dedicated logic, etc.), software (such as is run on a general purpose computer system or a dedicated machine), or a combination of both, which processing logic may be included in the construction toy 205 of FIG. 2. For simplicity of explanation, methods described herein are depicted and described as a series of acts. However, acts in accordance with this disclosure may occur in various orders and/or concurrently, and with other acts not presented and described herein. Further, not all illustrated acts may be required to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 7 illustrates a flow diagram of an example method 700 to monitor and model an object construction made from a set of construction toys. The method 700 may begin at block 705, where the processing logic may monitor behavior of a player of a set of construction toys. The set of construction toys may include one or more of the construction toys described in this document, such as the construction toy 100 of FIG. 1. The processing logic may monitor behavior of the player based on sensor data. The sensor data, for example, may be sensor data acquired by the one or more sensors 225 of FIG. 2. In at least one embodiment, the sensor data may be acquired as further described in conjunction with FIG. 8.

At block 710, the processing logic may record every connection the player may make using construction toys. The processing logic may store a block ID for construction toys that are connected to each other. Additionally or alternatively, the processing logic may store a connector ID pair for construction toys that are connected to each other. The processing logic may also store or create a timestamp indicative of a time around when the construction toys were connected to each other. The processing logic may also generate a graphical representation of the connections between construction toys, examples of which are described in conjunction with FIGS. 9A, 9B, 9C, 10A and 10.

At block 715, the processing logic may identify structurally similar constructions. In at least one embodiment, the processing logic may identify the structurally similar constructions by analyzing the graphical representations of the connections between construction toys and identifying similarities within the various constructions. For example, the structurally similar constructions may include various four legged objects (e.g., animals) of various shapes of sizes. The processing logic may identify the four legs as being a common characteristic of each of these structurally similar constructions. At block 720, the processing logic may group structurally similar constructions. In at least one embodiment, the processing logic may name or categorize each group of structurally similar constructions. \*\*\*

At block 725, the processing logic may measure behavior variability, behavior novelty, and complexity between the constructions. For a given time period p, the behavior variability may be measured based on operational variability and structural variability. Behavior novelty may be measured by construction novelty. Construction complexity may be measured by one or more of size, stage complexity, dimensionality complexity, arches complexity, or symmetry.

In at least one embodiment, operational variability may be determined as follows. Given an operation history window (e.g., w[i . . . j]), an operational variability of the jth operation may include an average distance between j and other operations in the operation history window. An example equation may be represented as:

$$ov(j) = \frac{\sum_{k=j-1}^{i} od(j, k)}{j-1},$$

where od(j, k) is a distance between the operations j and k. The operational variability of a window w[i . . . j] may include the average distance between adjacent operations in the window. An example equation may be represented as:

$$ov(w) = \frac{\sum_{k=i}^{j-1} od(k, k+1)}{j-i+1},$$

where ov measures behavior variability in real-time, such as at the moment of operation i, or within one play session. In at least one embodiment, the distance between operations i and j may be represented by the equation:

$$od(i,j) = w_n \times nd(i,j) + w_e \times ed(i,j),$$

where $w_n + w_e = 1$, nd is a node distance between operations i and j, and ed is an edge distance between operations i and j. The node distance, nd, between operations i and j may be represented by the equation:

$$nd(i, j) = \frac{\text{\# of different nodes}}{2}$$

The edge distance, ed, between operations i and j may be represented by the equation:

$ed(i,j) = w_1 \times$ # of edges with different operations $+ w_2 \times$ # of edges with different orientations $+ w_3 \times$ time difference normalized to [0,1], where $w_1+w_2+w_3=1$. In one example embodiment, nd $(i,j)=0$, ed $(i,j)=0.5$ and od $(i,j)=0.5\times 0+0.5\times 0.5=0.25$, where $w_n=w_n=0.5$.

Given a structure history window w[i ... j], structural variability of the jth structure may include the average distance between j and other structures in the window, which may be represented as:

$$sv(j) = \frac{\sum_{k=j-1}^{i} sd(j,k)}{j-1},$$

where sd(j, k) is the distance between structures j and k. The structural variability of window w[i ... j] may include the average distance between adjacent structures. An example equation for determining the structural variability of a window may be represented as:

$$sv(w) = \frac{\sum_{k=i}^{j-1} sd(k, k+1)}{j-i+1}.$$

The distance between structures i and j may be represented as:

$sd(i,j) = 1 - \text{sim}(i,j),$ where sim(i,j) includes a structural similarity between i and j. A structural similarity between graphs i and j may be represented as:

$$\text{sim}(i, j) = \frac{\text{\# of edges in } k}{\max(\text{\# of edges in } i, \text{\# of edges in } j)},$$

where k includes a maximum common subgraph.

In at least one embodiment, construction novelty may be determined as follows. Given a set of structures, the structures may be clustered based on their similarity. In at least one embodiment, given a time period p, the construction novelty cn(p) may include the number of new clusters emerged during the time period p. Creativity may be defined as novelty and usefulness. The processing logic may measure novelty during construction play (e.g., in real time), which may also contribute to or indicate a measurement of creativity.

Construction complexity may include a measurement of a structural complexity of block constructions. Determining the construction complexity may use one or more of the following metrics: size (e.g., # of nodes and edges, width, height, length), dimension (0D, 1D, 2D, 3D), stage (e.g., no structure, tower, row, cross, enclosure, arch, integration), a number of arches, a symmetry metric, etc.

At block 730, the processing logic may generate a visualization of the measured behavior variability and complexity between the constructions over time. The processing logic may also generate a chart or graph to visualize the player's activities over time, examples of which are described in conjunction with FIGS. 11A, 11B and 11C.

FIG. 8 illustrates a flow diagram of an example method 800 to send sensor data to a host computer device. The sensor data may be continuously or periodically sent to the host computer device, which may include the host computer device 210 of FIG. 2. Each construction toy in a set of construction toys may include processing logic that may periodically read and send sensor data to the host computer device.

At block 805, the processing logic may optionally wait for a predetermined amount of time before performing operations. At block 810, the processing logic may determine whether all connectors of a construction toy have been scanned. The processing logic may access a record of all connectors of a construction toy. The record may include a block ID and/or connector ID for each connector on the construction toy. The record may also include a connectivity status of each connector and a block ID and/or connector ID of an adjacent construction toy and/or alien connector that is coupled to the connector. In at least one embodiment, processing logic may periodically cycle through each connector of the construction toy, even if the connectors have previously been scanned. When the processing logic determines that all connectors of the construction toy have been scanned ("YES" at block 810), the processing logic may proceed to block 805.

When the processing logic determines that not all sides of the construction toy have been scanned ("NO" at block 810), the processing logic may read a connectivity status of a next connector at block 815.

At block 820, the processing logic may determine whether the connectivity status of the connector has changed. When the processing logic determines that the connectivity status of the connector has not changed ("NO" at block 820), the processing logic may proceed to block 805.

When the processing logic determines that the connectivity status of the connector has changed ("YES" at block 820), the processing logic may determine whether the connector is connected to an alien connector. The processing logic may use sensor data (e.g., proximity data) to determine whether the connector is connected to the alien connector.

When the processing logic determines that the connector is connected to the alien connector ("YES" at block 825), the processing logic may send a message to the host computer device to indicate the connection to the alien connector. When the processing logic determines that the connector is not connected to the alien connector ("NO" at block 825), the processing logic may send a message to the host computer device to indicate that the connector is not connected to an alien connector.

Figure 9A:
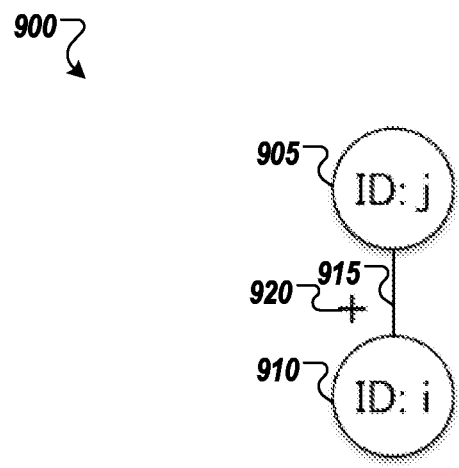
FIG. 9A illustrates an example graphical representation of an addition of a connection between construction toys.

FIG. 9A illustrates an example graphical representation 900 of an addition of a connection between construction toys, which are represented by construction toy symbols 905 and 910. As illustrated, construction toy symbol 905 is associated with a block ID "j" and the construction toy symbol 910 is associated with a block ID "i." When the two construction toys that correspond to construction toy symbols 905 and 910 are connected, the graphical representation 900 may include an edge 915 connecting the two construction toy symbols 905 and 910. The graphical representation 900 may include an icon 920 indicative of a connection between construction toys, which is illustrated as a "+" sign.

Figure 9B:
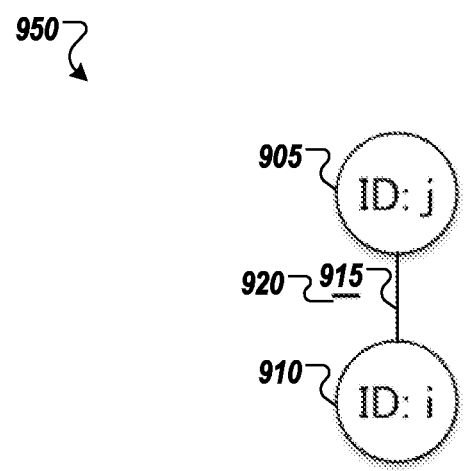
FIG. 9B illustrates an example graphical representation of a removal of a connection between construction toys.

FIG. 9B illustrates an example graphical representation 900 of a removal of a connection between construction toys, which are represented by construction toy symbols 905 and 910. When the two construction toys that correspond to construction toy symbols 905 and 910 are disconnected, the graphical representation 950 may include an edge 915 connecting the two construction toy symbols 905 and 910 to illustrate that the construction toys were previously connected. The graphical representation 950 may include an icon 920 indicative of a disconnection construction toys, which is illustrated as a "–" sign.

Figure 9C:
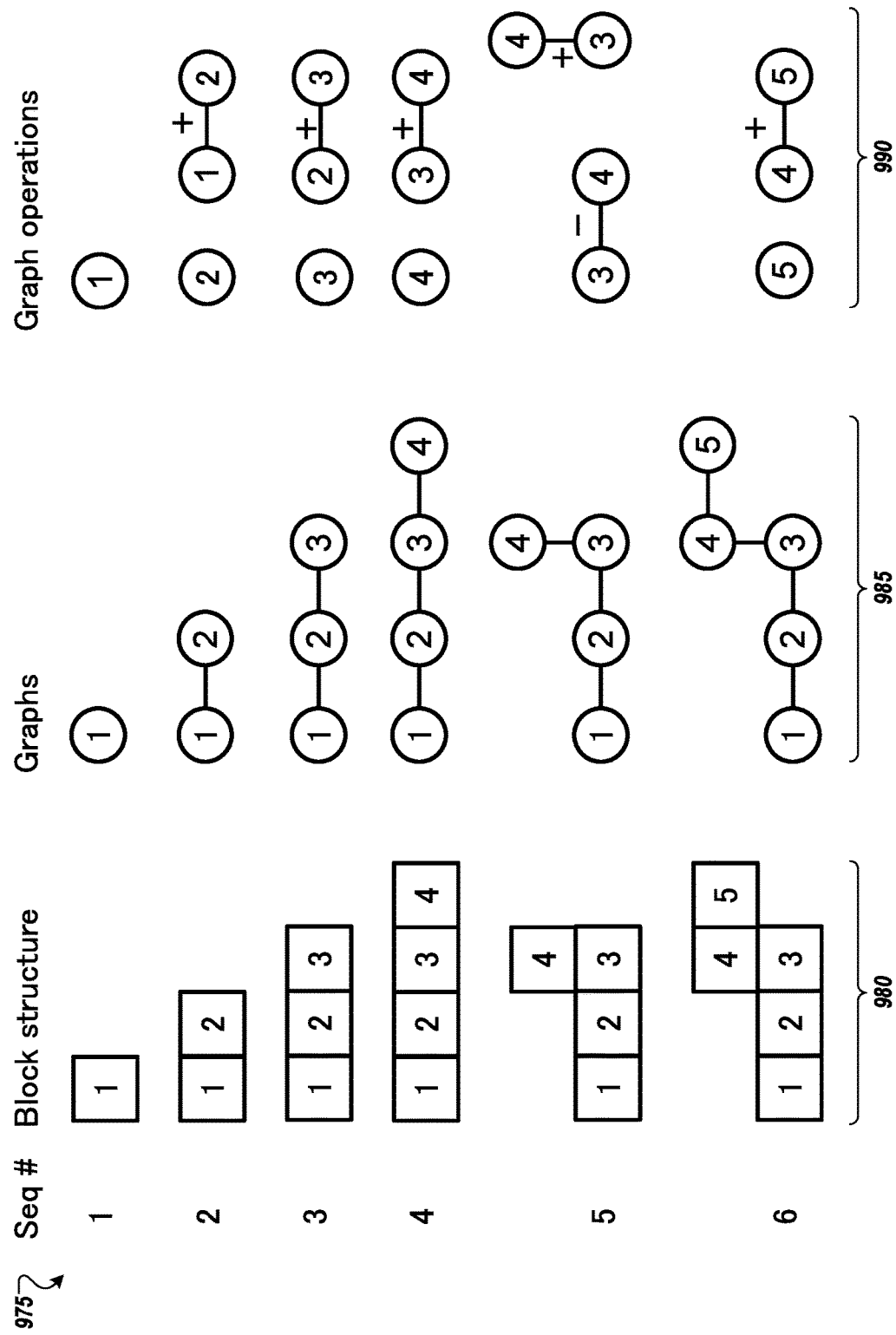
FIG. 9C illustrates an example graphical representation of a sequence of connections made between construction toys.

FIG. 9C illustrates an example graphical representation 975 of a sequence of connections made between construction toys. The block structure 980 represents the physical construction toys and the connections made therebetween at sequences 1, 2, 3, 4, 5, 6. The graphs 985 represent graphical representations of the sequence of connections made between the construction toys. The graph operations 990 indicate the operations performed by the player at each sequence. For example, at sequence 2, construction toys 1 and 2 were connected. At sequence 5, construction toys 1 and 2 were disconnected from a first connection (e.g., lateral connection) and reconnected in a second (e.g., vertical) connection.

Figure 10:
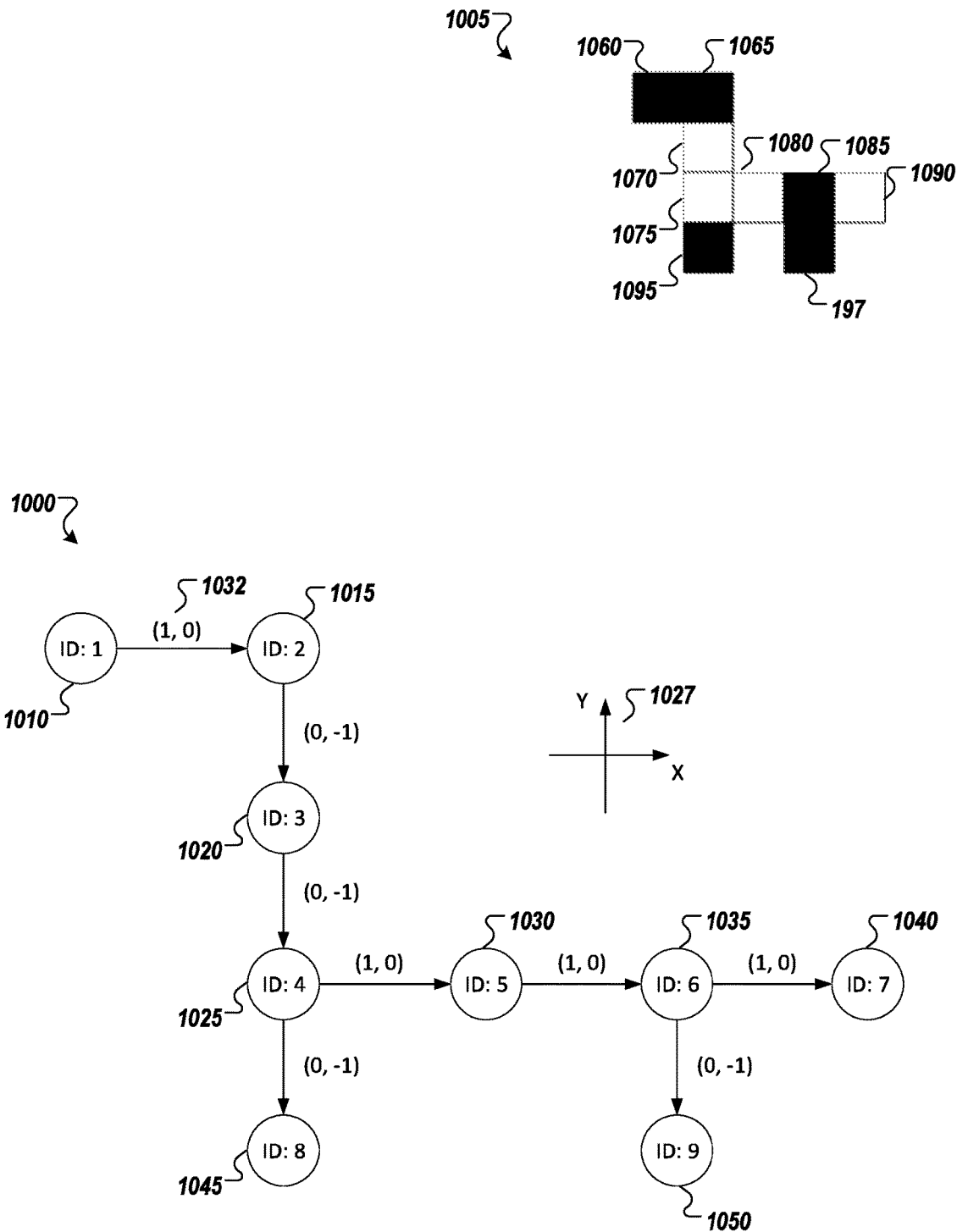
FIG. 10 illustrates a graphical representation of a physical structure created by a set of construction toys.

FIG. 10 illustrates a graphical representation 1000 of a physical structure 1005 created by a set of construction toys. The graphical representation 1000 may include construction toy nodes 1010, 1015, 1020, 1025, 1030, 1035, 1040, 1045, 1050, which may respectively correspond to physical construction toys 1060 (block ID=1), 1065 (block ID=2), 1070 (block ID=3), 1075 (block ID=4), 1080 (block ID=5), 1085 (block ID=6), 1090 (block ID=7), 1095 (block ID=8), and 1097 (block ID=9).

The graphical representation 1000 may indicate an order in which the construction toys were connected. As illustrated, the block ID may correspond to the order in which the construction toys were connected. In at least one embodiment, the graphical representation 1000 may include a separate indicator of the order in which the construction toys were connected. Each node may also have an associated color, shape, and other attributes that represent the corresponding construction toy.

The graphical representation 1000 may also include one or more edges 1032. The edges 1032 connecting two nodes represents a connection between two construction toys. The graphical representation 1000 may also include a coordinate system 1027. As the construction toys are connected, a direction and/or connection point may be indicated with respect to the coordinate system 1027. For example, in addition to illustrating a connection between construction toy nodes 1010 and 1015, the graphical representation 1000 may also indicate an edge 1032 as a vector, which is illustrated as "(1, 0)"—meaning that the direction was one unit in an x direction and zero units in a y direction. The edge orientation may be defined as a two dimensional vector (x, y) or a three dimensional vector (x, y, z).

Figure 11A:
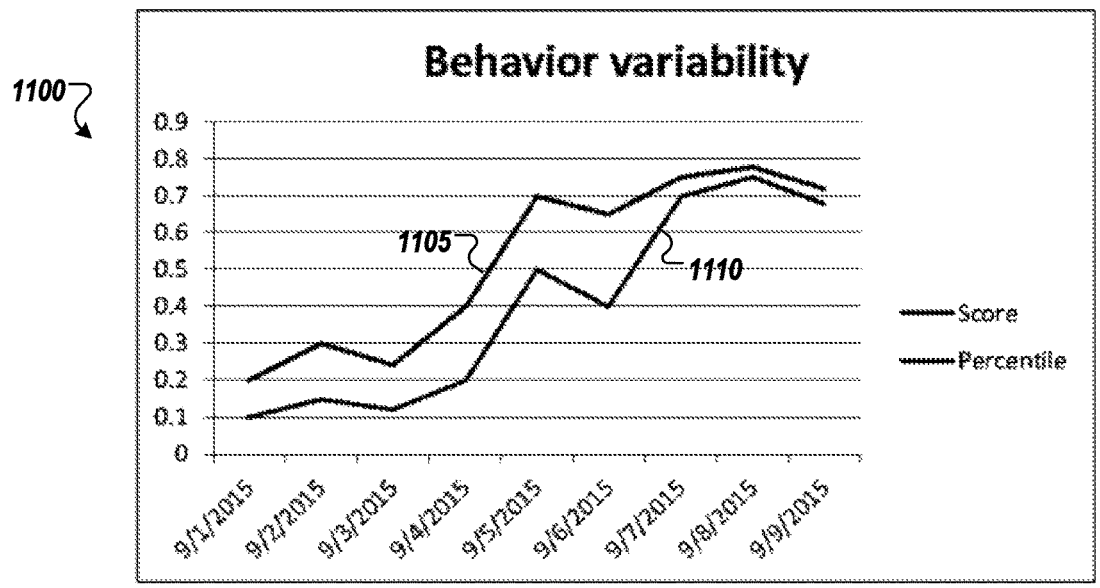
FIGS. 11A, 11B and 11C illustrate various graphical representation of various visualizations of a behavior profile over time.
Figure 11B:
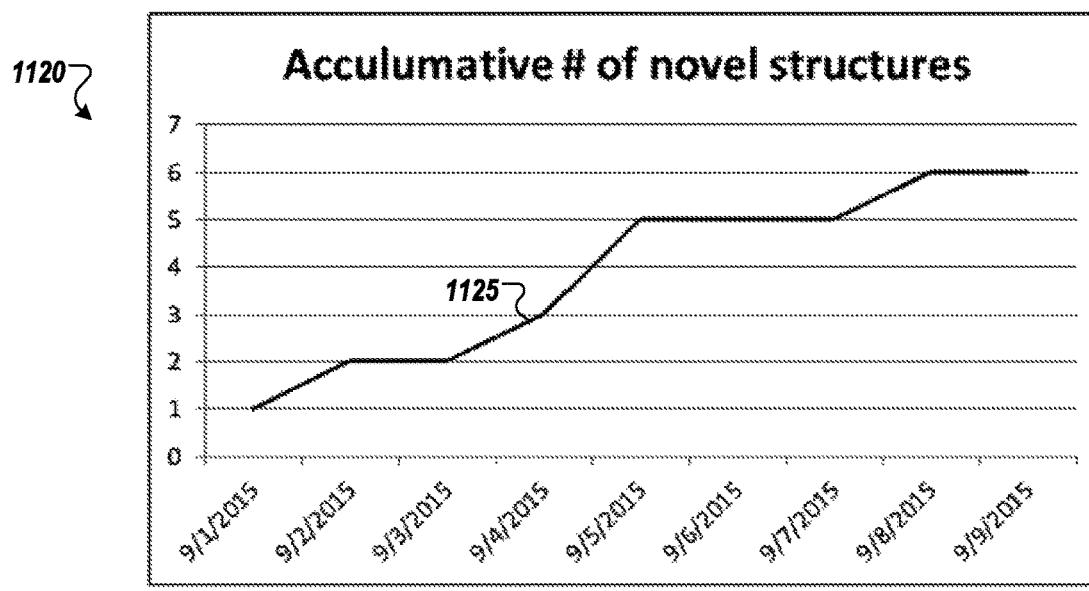
Figure 11C:
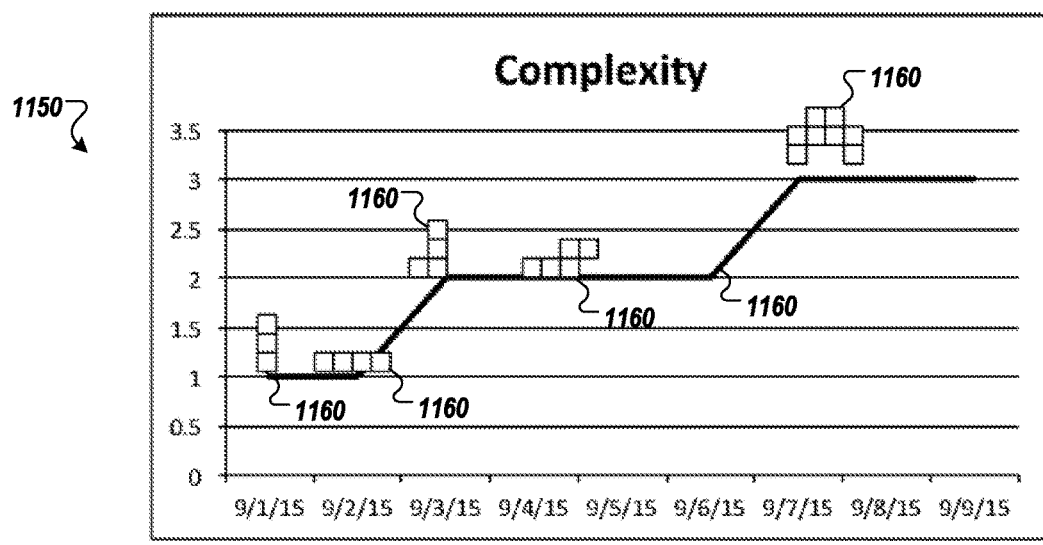

FIGS. 11A, 11B and 11C illustrate various graphical representation of various visualizations of a behavior profile over time. FIG. 11A illustrates a graphical representation 1100 of a behavior variability score 1105 over time. The graphical representation 1100 may also include a behavior variability percentile 1110. The behavior variability percentile 1110 may be calculated over time with respect to players with similar attributes, such as among players of a similar age. FIG. 11B illustrates a graphical representation 1120 of a number of novel constructions 1125 over time. FIG. 11C illustrates a graphical representation 1150 of a complexity measurement 1155 of constructions over time. The graphical representation 1150 may also include a sample construction 1160 to illustrate complexity of construction. Sample constructions 1160 may be grouped by complexity in complexity groups. In at least one embodiment, the sample construction 1160 may illustrate the most commonly appeared construction in each complexity group. The complexity groups may be named based on pre-labeled structures, a play assistance manager (e.g., play assistance manager 245 of FIG. 2) may recognize new block structures or may allow helpers to label the complexity groups.

Figure 12:
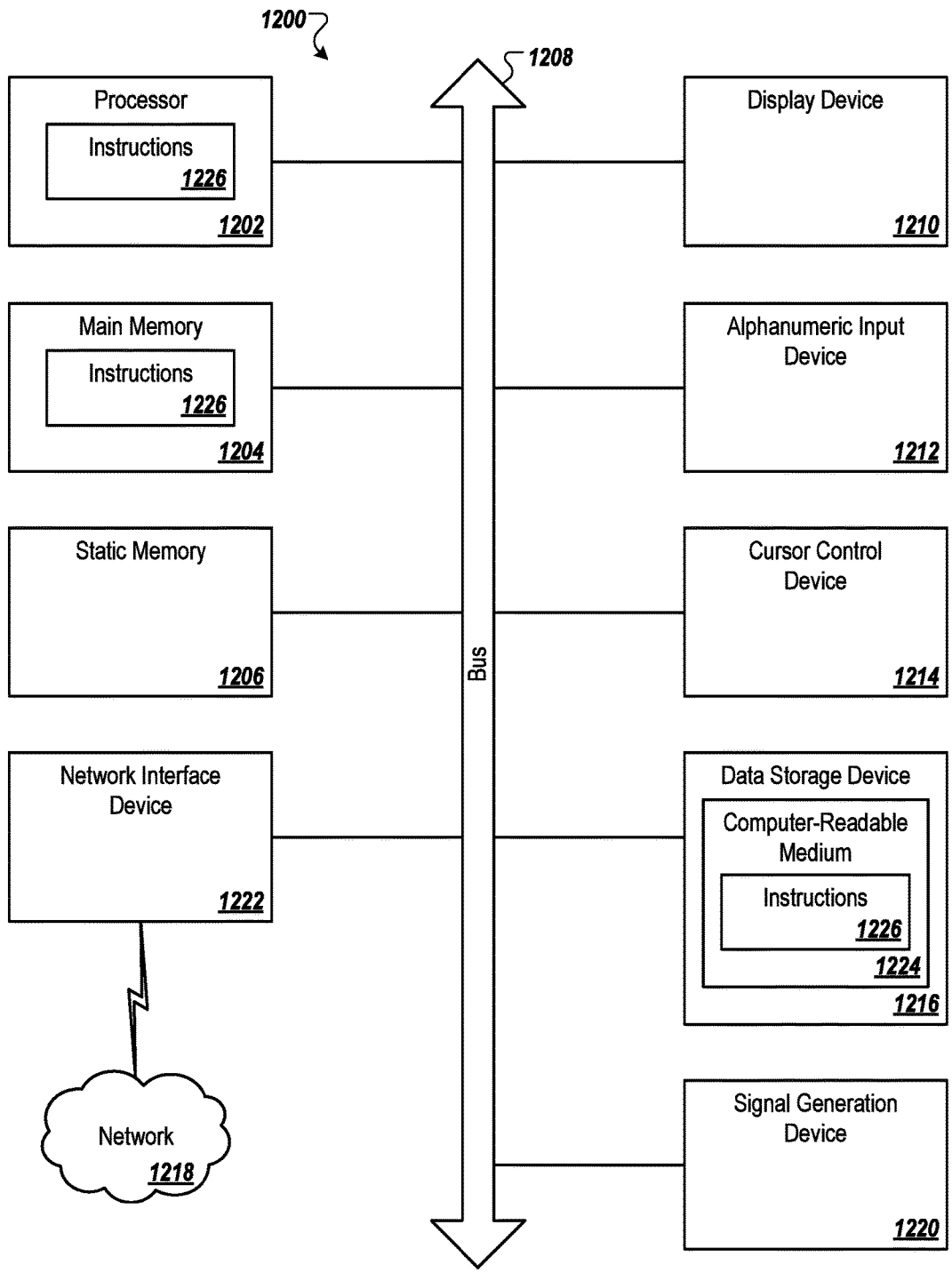
FIG. 12 illustrates a diagrammatic representation of a machine in the example form of a computing device within which a set of instructions, for causing the machine to perform any one or more of the methods discussed herein, may be executed.

FIG. 12 illustrates a diagrammatic representation of a machine in the example form of a computing device 1200 within which a set of instructions, for causing the machine to perform any one or more of the methods discussed herein, may be executed. The computing device 1200 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 1200 includes a processing device (e.g., a processor) 1202, a main memory 1204 (e.g., read-only memory (ROM), flash memory, dynamic random access memory (DRAM) such as synchronous DRAM (SDRAM)), a static memory 1206 (e.g., flash memory, static random access memory (SRAM)) and a data storage device 1216, which communicate with each other via a bus 1208.

Processing device 1202 represents one or more general-purpose processing devices such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1202 may also be one or more special-purpose processing devices such as an application specific integrated circuit (ASIC), a field programmable gate array (FPGA), a digital signal processor (DSP), network processor, or the like. The processing device 1202 is configured to execute instructions 1226 for performing the operations and steps discussed herein.

The computing device 1200 may further include a network interface device 1222 which may communicate with a network 1218. The computing device 1200 also may include a display device 1210 (e.g., a liquid crystal display (LCD) or a cathode ray tube (CRT)), an alphanumeric input device 1212 (e.g., a keyboard), a cursor control device 1214 (e.g., a mouse) and a signal generation device 1220 (e.g., a speaker). In one implementation, the display device 1210, the alphanumeric input device 1212, and the cursor control device 1214 may be combined into a single component or device (e.g., an LCD touch screen).

The data storage device 1216 may include a computer-readable storage medium 1224 on which is stored one or more sets of instructions 1226 embodying any one or more of the methods or functions described herein. The instructions 1226 may also reside, completely or at least partially, within the main memory 1204 and/or within the processing device 1202 during execution thereof by the computing device 1200, the main memory 1204 and the processing device 1202 also constituting computer-readable media. The instructions may further be transmitted or received over a network 1218 via the network interface device 1222.

While the computer-readable storage medium 1226 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Terms used herein and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such recitation may be interpreted to mean at least the recited number (e.g., the bare recitation of "two recitations," without other modifiers, means at least two recitations, or two or more recitations). Further, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it may be understood that the various changes, substitutions, and alterations may be made hereto without departing from the spirit and scope of the present disclosure.

The term "substantially" means within 5% or 10% of the value referred to or within manufacturing tolerances. Various embodiments are disclosed. The various embodiments may be partially or completely combined to produce other embodiments.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

What is claimed is:

1. A system comprising:
a memory; and
a processor operatively coupled to the memory, the processor being configured to execute instructions to:
monitor a behavior of a player of a first construction toy, the first construction toy includes at least one sensor to detect a first construction made by the player between the first construction toy and a second construction toy;
record a first order in which the player connected the first construction toy, the second construction toy, and a third construction toy to make the first construction;
identify a preexisting second construction that is similar to the first construction, the second construction being associated with a second order in which construction toys are connected to make the second construction;
define a group that includes the first construction and the preexisting second construction; and
determine a behavior variability and a complexity level for the player based on the first order being different than the second order.

2. The system of claim 1, the processor being further configured to execute an instruction to generate a visualization of the behavior variability and complexity level for the player.

3. The system of claim 1, wherein the first construction toy and the second construction toy are digital representations of physical construction toys, and wherein the processor is further configured to execute an instruction to provide an electronic interface by which the player may interact with the first construction toy and the second construction toy.

4. The system of claim 1, wherein the first construction toy includes a connector being configured to selectively couple the first construction toy to the second construction toy, the connector being adjustable between at least two connectivity states.

5. The system of claim 4, wherein the processor is configured to receive an indication that the connector has been connected to or disconnected from the second construction toy.

6. The system of claim 1, wherein the behavior variability may be determined based on a comparison of the first construction and the preexisting second construction.

7. The system of claim 6, wherein the comparison of the first construction and the preexisting second construction includes determining at least one difference in size, stage complexity, dimensionality complexity, arches complexity, or symmetry between the first construction and the preexisting second construction.

8. A method comprising:
monitoring a behavior of a player of a first construction toy, the first construction toy includes at least one sensor to detect a first construction made by the player between the first construction toy and a second construction toy;

recording a first order in which the player connected the first construction toy, the second construction toy, and a third construction toy to make the first construction;

identifying a preexisting second construction that is similar to the first construction, the second construction being associated with a second order in which construction toys are connected to make the second construction;

defining a group that includes the first construction and the preexisting second construction; and determining a behavior variability and a complexity level for the player based on the first order being different than the second order.

9. The method of claim 8, further comprising generating a visualization of the behavior variability and complexity level for the player.

10. The method of claim 8, wherein the first construction toy and the second construction toy are digital representations of physical construction toys, the method further comprising providing an electronic interface by which the player may interact with the first construction toy and the second construction toy.

11. The method of claim 8, wherein the first construction toy includes a connector being configured to selectively couple the first construction toy to the second construction toy, the connector being adjustable between at least two connectivity states.

12. The method of claim 11 further comprising receiving an indication that the connector has been connected to or disconnected from the second construction toy.

13. The method of claim 8, wherein the behavior variability may be determined based on a comparison of the first construction and the preexisting second construction.

14. The method of claim 13, wherein the comparison of the first construction and the preexisting second construction includes determining at least one difference in size, stage complexity, dimensionality complexity, arches complexity, or symmetry between the first construction and the preexisting second construction.

15. A non-transitory computer readable medium having stored therein executable code that, when executed by a processor, cause the processor to perform operations comprising:

monitoring a behavior of a player of a first construction toy, the first construction toy includes at least one sensor to detect a first construction made by the player between the first construction toy and a second construction toy;

recording a first order in which the player connected the first construction toy, the second construction toy, and a third construction toy to make the first construction;

identifying a preexisting second construction that is similar to the first construction, the second construction being associated with a second order in which construction toys are connected to make the second construction;

defining a group that includes the first construction and the preexisting second construction; and determining a behavior variability and a complexity level for the player based on the first order being different than the second order.

16. The non-transitory computer readable medium of claim 15, the operations further comprising generating a visualization of the behavior variability and complexity level for the player.

17. The non-transitory computer readable medium of claim 15, wherein the first construction toy and the second construction toy are digital representations of physical construction toys, the operations further comprising providing an electronic interface by which the player may interact with the first construction toy and the second construction toy.

18. The non-transitory computer readable medium of claim 15, wherein the first construction toy includes a connector being configured to selectively couple the first construction toy to the second construction toy, the connector being adjustable between at least two connectivity states.

19. The non-transitory computer readable medium of claim 18, the operations further comprising receiving an indication that the connector has been connected to or disconnected from the second construction toy.

20. The non-transitory computer readable medium of claim 15, wherein the behavior variability may be determined based on a comparison of the first construction and the preexisting second construction.

* * * * *